United States Patent [19]

Schapira et al.

[11] 4,374,039

[45] Feb. 15, 1983

[54] ANTICLUMPING PRODUCTS AND TREATMENTS BASED ON AMIN SALTS

[75] Inventors: Joseph Schapira, Paris; Jacques Ruel, Saint Gratien; Jean C. Cheminaud, Chatou; Robert Sadlo, Gennevilliers; Robert Christian, Pantin, all of France

[73] Assignee: Compagnie Francaise de Produits Industriels, Gennevilliers, France

[21] Appl. No.: 168,644

[22] Filed: Jul. 11, 1980

[30] Foreign Application Priority Data

Jul. 13, 1979 [FR] France .................................. 79 18295

[51] Int. Cl.³ ........................... C05G 3/00; C09K 3/00
[52] U.S. Cl. ....................................... 252/384; 71/27; 71/64.03
[58] Field of Search .................. 252/384; 71/27, 64 D

[56] References Cited

U.S. PATENT DOCUMENTS 3,388,990  6/1968  Maruta et al. ........................ 252/384
3,740,346  6/1973  Sarrads-Loucheur .............. 252/384
3,926,841 12/1975  Habasko et al. ..................... 252/384

*Primary Examiner*—Irwin Gluck
*Attorney, Agent, or Firm*—Fleit & Jacobson

[57] ABSTRACT

The invention relates to anticlumping products and to an anticlumping treatment. The anticlumping products for salts, simple or complex fertilizers, comprise, as active substance an effective amount of at least one non-hydrosoluble salt of an alkylamine, a cycloalkylamine or an aromatic amine, having from 2 to 22 carbon atoms, with an alkylnaphtalene-sulfonic acid whose alkylaryl radical includes from 11 to 32 carbon atoms.

30 Claims, No Drawings

ANTICLUMPING PRODUCTS AND TREATMENTS BASED ON AMIN SALTS

BACKGROUND AND GENERAL DESCRIPTION OF THE INVENTION

The invention relates to anticlumping products as well as to their mixtures with other products, notably other anticlumping agents and more particularly fatty acids such as stearic acid. It also relates to a treatment for preventing the dumping or the setting up or setting solid of salts, simple fertilizers and complex fertilizers.

It is known that salts, simple and complex fertilizers exhibit a high tendency to clump-formation, that is to say setting up or setting solid, notably when they are subjected to considerable pressure and climatic variations, namely during storage prior to their utilization. It is emphasized that such clumping can be manifested, for example, by the conversion of a sack of fertilizer into a single lump which is absolutely unusable. In the case of storage in a silo, the setting up may be such that the crust formed must be broken by means of hammer picks, breakers, etc.

Among the salts and simple fertilizers the invention relates to, one may cite nitrogenous salts such as ammonium, or potassium, nitrates, ammonium and calcium nitrates, mono-ammonium and diammonium sulfates, urea and potassium chloride; as regards complex fertilizers, it is recalled that they are constituted by complex mixtures of salts based on at least two of the elements of the group constituted by nitrogen, phosphorus and potassium, these fertilizers being identified by formulae of the $NPK_{x-y-z}$ type in which x, y, z respectively denote the percentage of nitrogen, of phosphoric anhydride and of $K_2O$ of the mixture constituting the complex fertilizer.

Applicants have unexpectedly found that, the non-hydrosoluble amine salts, notably alkanolamine, of alkylarylsulfonic acids are endowed with remarkable anticlumping properties with respect to salts, simple fertilizers and complex fertilizers. In the following of the description the term "aryl" in the phrase alkylarylsulfonic, designates the naphtalene ring, this being or not substituted.

The anticlumping product for salts, simple fertilizers and complex fertilizers, according to the invention comprises as active substance at least one non-hydrosoluble salt of an amine, notably of an alkylamine, cycloalkylamine or aromatic amine, including from 2 to 22 carbon atoms, and preferably of an alkanolamine having preferably from 2 to 12 carbon atoms, with an alkylarylsulfonic acid whose alkylaryl radical includes from 11 to 32 carbon atoms.

By the expression alkylaryl-sulfonic acid, is denoted all possible mixtures of acids the aromatic part of which may be mono- or polyalkyl substituted, including, for a given degree of substitution—that is to say a given number of alkyl substituents on the aromatic part—, all possible positions of the substituents respectively with one another, and for a given position, all the possible optical and geometric isomers.

The degree of substitution indicated in the formula by one of the suffixes of the group "mono-, di-, tri-, tetra-, penta-" (monoalkylaryl-sulfonic, di-alkylaryl-sulfonic, trialkylaryl-sulfonic, tetraalkylaryl-sulfonic, pentaalkylaryl-sulfonic acids) is an average degree of substitution signifying that the molar ratio alcohol/aryl used for the synthesis of the alkylaryl compound is 1/1, 2/1, 3/1, 4/1, 5/1, and leading in fact, for each degree of substitution, to complex mixtures of mono-, di-, tri-, tetra-, and pentaalkylaryl-sulfonic acids.

In the same way, the term sulfonic is such that it must be understood, for a given alkylaryl radical, as all possible mixtures of alkylaryl-mono-, -di- or -trisulfonic acids, including all their optical and geometric isomers.

The anticlumping treatment according to the invention is characterised by the fact that the salt, simple fertilizer or complex fertilizer is treated with an amount of 0.005 to 0.2% by weight with respect to the salt, simple or complex fertilizer of the anticlumping product according to the invention, having if necessary also recourse to an inert filler applied in the proportion of at the most about 4% by weight with respect to the salt, simple or complex fertilizer.

Other characteristics of the invention will appear in the description and the examples which follow and by means of which the invention will be well understood.

To fight against the setting up of salts, simple or complex fertilizers, recourse is therefore had to a product comprising at least one salt of an amine, notably of an alkylamine, cycloalkylamine, or an aromatic amine, including 2 to 22 carbon atoms, and preferably of an alkanolamine, having preferably from 2 to 12 carbon atoms, with an alkylaryl-sulfonic acid whose alkylaryl radical includes from 11 to 32 carbon atoms.

As regards firstly the alkylamine, the cycloalkylamine or the aromatic amine, it is advantageously selected from the group comprising the following amines:
triethylamine,
dipropylamine,
diisopropylamine,
tripropylamine,
dibutylamine,
diisobutylamine,
piperidine,
cyclohexylamine,
pyridine,
aniline,
morpholine,
quinoleine,
pyrrole,
imidazole, or a mixture of at least two of these compounds.

As regards the alkanolamine, the latter may be a monosubstituted, disubstituted or trisubstituted amine, advantageously selected from the group comprising:
monoethanolamine,
diethanolamine,
triethanolamine,
β-propanolamine,
β-dipropanolamine,
β-tripropanolamine,
monoisopropanolamine,
diisopropanolamine,
triisopropanolamine,
monoisobutanolamine,
diisobutanolamine,
triisobutanolamine, or a mixture of at least two of these compounds.

Among the group which has just been mentioned, are preferred monoethanolamine, diethanolamine, triethanolamine, monoisopropanolamine, diisopropanolamine, triisopropanolamine, or a mixture of at least two of these compounds.

As regards the alkylarylsulfonic acid considered, it is constituted by an alkylnaphtalenesulfonic acid having from 11 to 32 carbon atoms.

According to a first embodiment, the invention relates to the alkylnaphtalene-sulfonic acid comprising from 11 to 23 carbon atoms.

According to a second embodiment, the invention relates to the alkylnaphtalene-sulfonic acids comprising from 24 to 32 carbon atoms.

In the case of the alkylnaphtalene-sulfonic acids, comprising from 11 to 23 carbon atoms, those comprising from 18 to 23 carbon atoms are preferred.

In the case of alkylnaphtalene-sulfonic acids comprising from 24 to 32 carbon atoms, those comprising from 24 to 28 carbon atoms are preferred.

The alkylaryl-sulfonic acid (being understood that sulfonic means a -mono-, -di-, or -trisulfonic) is advantageously selected in the group comprising the acids having from 11 to 23 carbon atoms and which are:
tripropyl and triisoprophlnaphtalene-sulfonic,
tripropyl and triisopropylmethylnaphtalene-sulfonic,
tripropyl and triisopropyldimethylnaphtalene-sulfonic,
diamyl naphtalene-sulfonic,
diamyl methylnaphtalene-sulfonic,
diamyl dimethylnaphtalene-sulfonic,
(by "amyl" is designated linear amyl, isoamyl and tert-amyl).
dibutyl and diisobutylnaphtalene-sulfonic,
dibutyl and diisobutylmethylnaphtalene-sulfonic,
tributyl and triisobutylnaphtalene-sulfonic,
tributyl and triisobutylmethylnaphtalene-sulfonic
dibutyl and diisobutyldimethylnaphtalene-sulfonic,
tetrapropyl and tetraisopropylnaphtalene-sulfonic,
tetrapropyl and tetraisopropylmethylnaphtalene-sulfonic,
dihexyl naphtalene-sulfonic,
dihexyl methylnaphtalene-sulfonic.

Among the above-mentioned alkylarlyl-sulfonic acids, the most preferred acids are the eight following acids (these acid groups will be designated under group A)
tributyl and triisobutyl naphtalene-sulfonic
tributyl and triisobutyl methylnaphtalene-sulfonic,
tetrapropyl and tetraisopropylnaphtalene-sulfonic,
tetrapropyl and tetraisopropylmethylnaphtalene-sulfonic.

The alkylaryl-sulfonic acid can also advantageously be chosen in the group comprising the following acids having from 24 to 32 carbon atoms:
tributyl and triisobutyldimethylnaphtalene-sulfonic,
dihexyldimethylnaphtalene-sulfonic,
tetrapropyl and tetraisoprophldimethylnaphtalene-sulfonic,
tetrabutyl and tetraisobutylnaphtalene-sulfonic,
tetrabutyl and tetraisobutylmethylnaphtalene-sulfonic,
tetrabutyl and tetraisobutyldimethylnaphtalene-sulfonic,
pentapropyl and pentaisopropylnaphtalene-sulfonic,
pentapropyl and pentaisopropylmethylnaphtalene-sulfonic,
pentapropyl and pentaisopropyldimethylnaphtalene sulfonic,
pentabutyl and pentaisobutylnaphtalene-sulfonic,
pentabutyl and pentaisobutylmethylnaphtalene-sulfonic,
pentabutyl and pentaisobutyldimethyl naphtalene-sulfonic,
triamylnaphtalene-sulfonic,
triamylmethylnaphtalene-sulfonic,
triamyldimethylnaphtalene-sulfonic,
ethyl-2-hexyl naphtalene-sulfonic,
ethyl-2-hexyl methylnaphtalene-sulfonic,
ethyl-2-hexyl dimethylnaphtalene-sulfonic,
tetraamylnaphtalene-sulfonic,
tetraamylmethylnaphtalene-sulfonic,
tetraamyldimethylnaphtalene-sulfonic,
dinonylnaphtalene-sulfonic,
dinonylmethylnaphtalene-sulfonic,
dinonyldimethylnaphtalene-sulfonic.

Among the alkylaryl-sulfonic acids above-mentioned, the twenty-two following acids are most particularly preferred (this acid group will be designated by group B)
tributyl and triisobutyl dimethylnaphtalene-sulfonic
tetrapropyl and tetraisorpopyldimethylnaphtalene-sulfonic,
pentapropyl and pentaisorpopylnaphtalene-sulfonic,
pentapropyl and pentaisopropylmethylnaphtalene-sulfonic,
pentapropyl and pentaisopropyldimethylnaphtalene-sulfonic,
tetrabutyl and tetraisobutylnaphtalene-sulfonic,
tetrabutyl and tetraisobutylmethylnaphtalene-sulfonic,
tetrabutyl and tetraisobutyldimethylnaphtalene-sulfonic,
pentabutyl and pentaisobutylnaphtalene-sulfonic,
pentabutyl and pentaisobutylmethylnaphtalene-sulfonic,
pentabutyl and pentaisobutyldimethylnaphtalene-sulfonic.

A preferred class of anticlumping products for salts, simple and complex fertilizers, according to the invention comprises as active substance at least one non-hydrosoluble salt selected in the group constituted by the sulfonates of monoethanolamine on the one hand and of monoisopropanolamine on the other hand of the eight acids of group A and of the twenty two acids of group B.

The invention also relates to the mixture of at least two of the salts obtained from the above-mentioned amines and alkylaryl-sulfonic acis.

As regards the amine alkylaryl sulfonates, these products as well as their preparation are well-known and described in the scientific litterature as surface-active products.

As regards the amine alkylarylsulfonates whose corresponding sulfonic acid has a number of carbon atoms from 11 to 17, they are non-hydrosoluble insofar as the amine being part of the composition of the above-mentioned salt be heavy enough, that is to say comprises at least 7 carbon atoms.

As regards the amine alkylarylsulfonates, whose corresponding sulfonic acids comprise a number of carbon atoms from 18 to 23, they are non-hydrosoluble, whatever the amine considered and being part of the composition of the above-mentioned salt.

It is the same for amine alkylarylsulfonates whose corresponding sulfonic acid comprises from 24 to 32 carbon atoms.

The non-hydrosoluble alkylarylsulfonates being part of the composition of the anticlumping products according to the invention are soluble in organic solvents and can be processed in industrial solvents such as products derivated from petroleum, notably from fuel, oils, notably aromatic and naphtenic oils etc. or molten. When treating the salt, the simple fertilizer or the complex fertilizer, in order to prevent it from clumping and setting up, the non-hydrosoluble alkylarylsulfonates can be processed with a coating agent selected in the group constituted by chalk, infusory earth talk, clays and the like.

The fact that one can resort or not to such a coating agent depends on the quality of the salt, of a simple fertilizer or complex fertilizer to be treated.

In order to treat a salt, a simple or complex fertilizer in order to prevent it from setting up, according to the invention, the quantity is 0.005 to 0.2% by weight with respect to the above-mentioned salt, simple or complex fertilizer of the anticlumping product according to the invention, is supplied.

The incorporation can take place:

by spraying onto the salt, simple or complex fertilizer to be treated either the molten product, or a solution in a solvent of the anticlumping product, this spraying being possibly followed by a coating by a filler such als chalk, infusory earth, talc, clays and the like;

by coating the salts, simple or complex fertilizers by means of a filler of the above-mentioned type, followed either by spraying of the above-said solution of the anticlumping product, or by spraying of the latter in the molten state;

by absorption of the anticlumping product according to the invention on a filler of the above-mentioned type and then coating of the salts, simple or complex fertilizers by the thus treated filler;

by mixing the anticlumping product with solutions of salts, simple or complex fertilizers to be treated during the manufacture of the latter before the production of the dry product.

by introducing the anticlumping product according to the invention, in the shape of power or flakes, on to the salt, simple or complex fertilizer to be treated, immediately after their shaping into granules or prills and before coating, the salt, simple or complex fertilizer having to be hot enough as to cause the melting and the uniform distribution of the anticlumping product.

The amounts of the anticlumping product applied may vary from 0.005 to 0.2% by weight with respect to the salt, to the simple fertilizer and to the complex fertilizer; preferably these amounts are comprised between 0.02 and 0.1%.

The amount of coating fillers possibly applied may also range up to 4% with respect to the salt or fertilizer treated: in general amounts of about 0.2 to 1% are sufficient.

The invention also relates to the mixtures of at least one of the anticlumping products according to the invention with other products, notably other anticlumping agents and more particularly fatty acids including notably from 4 to 22 carbon atoms. As regards these aliphatic or aromatic fatty acids, it is preferable to select those from the group comprising: butyric, hexanoic, ethylhexanoic, capric, undecylic, lauric, palmitic, stearic, oleinic, linoleic, linolenic, ricinoleic, benzoic, benzenepolycarboxylic, naphthoic, naphthalenepolycarboxylic acid.

In the above-indicated group of fatty acids, stearic acid is preferred.

The fatty acids which can be part of the composition of the mixture with anticlumping agents according to the invention are present in the above-said mixture in the proportion of about 30% to about 70% by weight, calculated with respect to the total weight of the mixture.

In particular, for mixtures comprising stearic acid, the proportion advantageously preferred of stearic acid is from about 50 to 70% by weight, with respect to the total weight of the mixture, this proportion varying according to the characteristics of the fertilizers and of the salts to be treated, notably according to the process for preparing the fertilizer or the salt, the residual moisture, the surface hardness, etc.

As regards the anticlumping agents which can be part of the composition of the mixture, may be mentioned among the products currently used at the present time the fatty amines marketed for this purpose.

To illustrate the anticlumping properties of the products according to the invention, a certain number of tests were carried out consisting of forming cylindrical specimens of 4 cm height and 4 cm diameter using the treated or untreated salt or fertilizer, and subjecting them to a pressure of 0.8 kg/cm$^2$ for 48 hours or more, in an enclosure where the temperature and humidity can possibly be modified in two cycles for example of 24 hours comprising a hot and moist period during the day (about 29° C. and about 60% relative humidity) and a cold and dry period during the night (about 26° C. and 40% relative humidity).

The specimens were then crushed between two parallel plates of a dynamometer.

The crushing force observed constitutes a measure of the degree of setting up of the salt or of the fertilizer. The value 100 is given to the crushing strength observed for a treatment taken as reference, and the values found are expressed for the other treatment as a percentage with respect to the reference measurement. The lower this value, the better the anticlumping treatment.

For each treatment, 10 specimens were formed and the average percentage of the degree of setting up indicated.

To evaluate the anticlumping properties of the product according to the invention, actual stackings were also carried out. For this, 4 to 6 bags of fertilizers treated with products according to the invention were arranged on a paddle, then above the latter was arranged a paddle inverted and the whole was loaded with weights which could reach from 4 to 10 tons.

After 1 to 3 months of storage under load, the percentage of setting up was evaluated by weighing the lumps. The result of the clumping is expressed in % of clumping with respect to an effectiveness control by forming the ratio of the weight of clumps of the products according to the invention to the weight of clumps of the control. The hardness of these clumps or their ability to be crumbled is also taken as a criterion.

To evaluate the dust on taking up again the fertilizers treated according to the invention, the latter were subjected to a fall from a given height and the amount of dust formed estimated by weighing, or indeed again the latter is evaluated by opacity measurements, the test being carried out in a closed container with a transparent wall.

The dust values obtained were divided for each of the treated fertilizers by the value obtained by the fertilizer taken as a control and thus a dust index was obtained. The lower the index, the better the anti-dust processing effected.

For the preparation of the acids from which the above-mentioned products according to the invention are prepared, the following process can be applied:

Naphtalene, methyl-naphtalene or dimethyl naphtalene or any other petroleum distillation cut, essentially constituted by at least one of the above-mentioned aromatic compounds, is mixed in order to be alkylated to the appropriate alcohol in the desired ratio. The mixture is brought to a temperature comprised between 40° and 80° C. to be selected according to the volatility and reactivity of the used alcohol, and concentrated sulfuric acid (66° B) is introduced in an amount sufficient to provide alkylation. This one occurs by deshydratation between the alcohol and the aromatic ring. The mixture is allowed to react at the temperature to which it has been brought for a duration comprised between 2 and 5 hours.

Then an excess of concentrated acid or oleum of about 20% of $SO_3$ is added in a ratio comprised between 2 and 6 moles of acid per mole of aromatic compounds, the quantity being function of the substitution of the abovesaid aromatic compound. The temperature is maintained at the value comprised between 40° and 80° for a duration of 2 to 5 hours.

Then an hydration reaction is carried out under important cooling down, at a temperature under 80° C. and the sulfuric acid is allowed to settle. The alkylarylsulfonic acid is obtained in the superior phase.

The alkylarylsulfonic acid is then transformed into alkylaryl sulfonate of amine by means of neutralization in hot conditions at a temperature comprised between 40° C. and 70° C., with the appropriate amine. Thus, in the case of the synthesis of a monoethanolamine salt, the alkylarylsulfonic acid will be neutralized by monoethanolamine and in the case of the synthesis of isopropanolamine salt, the neutralization is carried out by isopropanolamine.

Tetraisopropylmethylnaphthalene-monosulfonic acid may be prepared by treating 1 mole of methylnaphthalene with 4 moles of isopropanol in the presence of an excess of sulfuric acid, then by sulfonating with, for example, oleum with 20% of $SO_3$;

tetraisopropyldimethylnaphthalene-monosulfonic acid may be prepared by treating 1 mole of dimethylnaphthalene with 4 moles of isopropanol in the presence of an excess of sulfuric acid and then by sulfonating with, for example, oleum with 20% of $SO_3$.

DESCRIPTION OF PREFERRED EMBODIMENTS

The following Examples are intended to enable the invention to be better understood but are not to be regarded as limiting in any way.

EXAMPLE 1

Tetraisopropylmethylnaphthalene-monosulfonic acid is prepared as previously described and it is neutralised by means of monoethanolamine, thus obtaining the monoethanolamine salt of tetraisopropylmethylnaphthalene-sulfonic acid.

10 kg of granular or prilled ammonium nitrate whose nitrogen titre is 33.5% was loaded into a concrete-mixer, then there is sprayed onto the ammonium nitrate, at a temperature of 80°-85° C., 6 g of a molten mixture, which mixture is constituted by 2 g of the monoethanolamine salt of tetraisopropylmethylnaphthalene-monosulfonic acid and 4 g of stearic acid. The concrete-mixer was allowed to rotate for about 5 min. so that the mixture of products above-mentioned is uniformly distributed over all the ammonium nitrate beads.

In a clumping box, comparison was made of the results obtained with the ammonium nitrate treated with the mixture of monoethanolamine salt of the above-indicated sulfonic acid and of stearic acid, with the results obtained with ammonium nitrate on which molten stearylamine has been sprayed, in the proportion of 600 grams per ton (used as effectiveness control), the spraying taking place at a temperature of 80°-85° C.

After two days' storage in the clumping box with alternance of hot and cold cycles as above-indicated, the crushing strength of the control of ammonium nitrate which has not undergone any treatment is measured. The crushing strength is 15 daN, which corresponds to a clumping value of 100%.

The clumping rate of the ammonium nitrate treated by the amine is 50% and that of ammonium nitrate treated by the above-indicated mixture is 0%.

To evaluate the dust after storage of the fertilizers, the experiment such as above described on a general point of view is carried out. If the index 1 is given to the untreated ammonium nitrate control, in the case of ammonium nitrate subjected to the treatment with the above-indicated mixture, this index is practically equal to 1, and, in the case of the treatment of the ammonium nitrate which has been treated with the amine, it varies from 2 to 3.

EXAMPLE 2

Tetraisopropylmethylnaphthalene-monosulfonic acid is prepared and neutralised by means of monoethanolamine, the product obtained being the monoethanolamine salt of tetraisoproylmethylnaphthalene-monosulfonic acid. A 30% solution of monoethanolamine salt is formed in heavy fuel and 10 g of this solution previously heated to 80° C. is sprayed in a concrete-mixer on to 10 kg of prilled ammonium nitrate, whose nitrogen titre was 26%.

A control is prepared by spraying 12 g of 25% aminated oil solution on to 10 kg of ammonium nitrate. This spraying is carried out at a temperature of 80°-85° C., proceeding as for spraying already mentioned.

Clumping tests follow to compare the results obtained on fertilizer treated according to those two treatments.

After a week's storage in a clumping box, the untreated ammonium nitrate has a crushing strength of 20 daN, which corresponds to a clumping value of 100%. The clumping rate of the ammonium nitrate which has been treated with the aminated oil is 2%, whilst it is 0% for the ammonium nitrate which has been treated with the monoethanolamine salt.

EXAMPLE 3

In a concrete mixture, spraying of 10 g of a 30% solution in oil, of the monoethanolamine salt described in the preceding Example is carried out at a temperature of 80°-85° C. This spraying is carried out on to 10 kg of granulated ammonium nitrate, whose nitrogen content is 26%. This spraying is followed by a coating which is carried out with 25 g of micronised chalk.

An effectiveness control of ammonium nitrate is prepared by treating 10 kg of ammonium nitrate with 10 g of 30% amine solution in oil, said solution being sprayed at a temperature of 80°-85° C., and then coating the ammonium nitrate with 50 g of micronised chalk.

The clumping rate of the ammonium nitrate which has been treated with the 30% amine solution is 12%, measured with respect to an untreated ammonium nitrate control, whose clumping rate is considered to be 100%.

It is 0% for the ammonium nitrate which has been treated with the monoethanolamine salt of Example 3.

EXAMPLE 4

The anticlumping product which is used is a 30% solution of the monoethanolamine salt of tetraisopropylmonomethylnaphthalene-monosulfonic acid in heavy fuel. 20 g of the previously described solution is sprayed at a temperature of 80° C., in a concrete-mixer on to 20 kg of NPK 3×17 fertilizer and a coating is carried out with 20 g of commercial clay.

The same treatment is again carried out on to NPK 3×17 fertilizer by carrying out two distinct coatings, a coating with 60 g of clay, then with 100 g of clay.

An effectiveness control is prepared by coating 20 kg of NPK 3×17 fertilizer in the same way, by means of 120 g of a commercial clay, and by spraying 24 g of a 30% commercial solution of stearylamine in oil at a temperature of 80° C.

The fertilizer thus treated is tested by trials with actual stacking. After one month's storage under load, the clumping is evaluated by weighing the lumps observed in each bag, and by evaluating their ability to crumble.

The clumping rate is 60% for the effectiveness control fertilizer and the lumps are hard. The fertilizer which has been treated with the monoethanolamine salt solution and coated with 100 g of clay has a clumping degree of 5%.

In the case where the coating is made with 60 g of clay, the rate of clumping of the fertilizer is 19% and, in the case where the coating is carried out with 20 g of clay, the clumping degree is 32%.

For the three latter cases, the lumps are friable.

An untreated control completely steps up, which corresponds to a clumping rate of 100%, and in this case the lumps are particularly hard.

As regards the evaluation of the dust, if the untreated control has the index 1, this index is practically equal to 1 in each of the three cases of the fertilizer which has been treated by the monoethanolamine salt. As to the dust index of the fertilizer treated with the amine, it is 10.5.

EXAMPLE 5

Tetraisopropyldimethyl-naphthalene-monosulfonic acid is prepared as it has just been indicated and is neutralised with monoethanolamine.

In a concrete-mixer a molten mixture constituted by 2 g of the monoethanolamine salt described above and 4 g of stearic acid is sprayed on to 10 kg of ammonium nitrate whose nitrogen titre is 33.5%, the mixture being brought to 80° C.

The ammonium nitrate thus treated was placed in a clumping box and the same results were observed as those obtained with the ammonium nitrate treated with the product according to the invention described in Example 1.

EXAMPLE 6

By carrying out the process as above described, a petroleum distillation cut is alkylated, the composition of which in naphthalene at various substitution degrees is the following:

naptalene 1,9%
2-methyl naphtalene 26,6%
1-methyl naphtalene 18,3%
dimethyl naphtalene 49,1% (various isomers)
heavy products 4,1% (such as acenaphtene).

Alkylation is carried out by reacting 4 moles of isopropanol by equivalent of naphtalenic ring and is followed by sulfonation.

The mixture of tetraisopropyl-arylsulfonic acids which is obtained is then neutralized with monoethanolamine, obtaining a mixture of tetraisopropyl-arylsulfonates of monoethanolamine which is easily soluble in an oil containing 60% of aromatic products. A 30% solution of the above mixture in this solvent is prepared. 20 kg of fresh drum granulated NPK 3×17 fertilizer are loaded into a concrete-mixer. A coating of the fertilizer is then carried out with 120 g (6 kg of talc per fertilizer ton) and 20 ml (1 liter per fertilizer ton) of the preceding solution are sprayed onto the coated fertilizer.

A control is prepared in the same way, using the same amount of talc, then 24 ml of a commercial solution of 20% of stearylamine in oil (1,2 Liter per fertilizer ton) are sprayed onto the control.

Another control is constituted by the fertilizer which has not been treated. The fertilizer thus obtained is put and closed in bags to which a pressure of 1 kg/cm² is applied. Two months afterwards, the results which are obtained are the following:

the control which has not been treated is completely set up and forms a monolith; after a fall of one meter, the monolith breaks up into four pieces which cannot be easily crumbled by hands the NPK fertilizer which has been treated with the aminated oil has some lumps (2 kg of lumps on 20 kg);

the fertilizer which has been treated with the product according to the example contains no lumps.

Besides, with respect to the dust observed on fertilizer samples which have been treated and kept in bottle, one month after the storage, if the index 1 is given to the control which has not been treated and which has been set up, the fertilizer which has been treated by the aminated oil has an index of 3,5 and the fertilizer which has been treated by the product according to the invention has an index of 1.2.

EXAMPLE 7

From the alkylarylsulfonic acid which has been obtained as it has been described in example 6, five salts are prepared by neutralization with the following amines:

monoethanolamine
diethanolamine
triethanolamine
monoisopropylamine
di-isopropylamine.

The neutralization is carried out until the pH obtained, which is measured with paper indicating pH, is from 8 to 10.

The corresponding alkylaryl sulfonates are designated by A, B, C, D, E.

The same NPK fertilizer is treated as it has been indicated in example 6, the coating being carried out with talc.

After storage of one month, under pressure, in the conditions of example 6, all the fertilizers which have been treated by the salts A, B, C, D, E present no lumps, while the control which has neither been treated nor coated, completely sets up. The fertilizer which has been treated after coating by means of the commercial stearylamine solution contains some lumps.

After one month as in example 6, the fertilizer which has been treated respectively by the salts A, B, C, D, E, according to the invention, presents a dust index which is practically equivalent to the one of the fertilizer which has not been treated, with respect to the fertilizer which has been treated by means of the commercial aminated oil, it has an index which is twice as high. The fertilizers are preferably treated by means of the monoethanolamine and monoisopropanolamine salts for economic reasons.

EXAMPLE 8

An alkylaryl sulfonic acid is prepared from the distillation cut which has been described in example 6, by alkylating the cut by means of 4 moles of isobutanol, as it has been described in the general process. The acid which has been obtained is neutralized by means of monoethanolamine until the pH is 8 to 10. The monoethanolamine salt thus obtained is designated by F.

A monoethanolamine salt G is prepared by applying the process which has been described for the obtention of the monoethanolamine salt F, after replacing the 4 moles of isobutanol by 4 moles of n-butanol.

A monoethanolamine salt H is also prepared by applying the process used for the preparation of salt G, after replacing the 4 moles of isobutanol by 3 moles of isobutanol in the alkylating step.

The F, G, H salts are dispersed in the ratio of 30% in concentrated fuel, at a temperature of 80° C. These 30% dispersions are sprayed onto 20 kg of granulated ammonium nitrate, whose titre in respect of nitrogen is 26%, at a temperature of 80° C., in a concrete-mixer, at the rate of 1 liter per ton, the spraying being followed by a coating by means of 3 kg per ton of microfine chalk. From the fertilizer which has thus been treated, specimens are shaped which are subjected to the pressure in clumping boxes, as it has been described.

Cyclic variations of ambiant humidity comprised between 40 and 70% of relative humidity are applied in the clumping box, at a constant pressure of 26° C., each cycle lasting two days.

The specimens are thus submitted for two days at a temperature of 26° C. and a relative humidity of 40%, then for two days, at a temperature of 26° C. and a relative humidity of 70%, then again for two days at a relative humidity of 40% at a temperature of 26° C.

The specimens are then taken out of the clumping boxes and are subjected to the crushing text.

The results obtained are the following:

|  |  | applied crushing strength | relative clumping |
|---|---|---|---|
| untreated fertilizer control |  | 30 daN | 100% |
| fertilizer which has been treated with salt | F | 2 daN | 7% |
| fertilizer which has been treated with salt | G | 1,8 daN | 6% |
| fertilizer which has been treated with salt | H | 6 daN | 20% |

Each measure of the crushing strength is the average of 10 measures, the extreme values are not taken into account.

EXAMPLE 9

Tetraisopropylmonomethylnaphtalene-monosulfonic acid is neutralised by means of monoisopropanolamine and spraying is carried out on 10 kg of ammonium nitrate whose nitrogen titre is 33.5%, of a molten mixture brought to 80° C. and constituted by 2 g of the above-described isopropanolamine salt and by 4 g of stearic acid.

The thus treated nitrate is tested comparatively with the nitrate treated with the anticlumping product according to the invention described in Example 1, and the same results as in Example 1 as observed.

EXAMPLE 10

By using the distillation cut described in example 6, the following salts are prepared:

Preparation of salt L:

The distillation cut is alkylated by means of two moles of isoamylic alcohol per mole of equivalent or naphtalenic ring, the excess of sulfuric acid when sulfonation occurs, being reduced to 2, 3 moles per mole of equivalent or naphtalenic ring and the alkylating time being prolonged for three hours.

The alkylarylsulfonic acid thus obtained is neutralized in hot conditions with monoethenolamine until a pH of 8 to 10 is obtained. The salt thus obtained is put into a solution of 30% of salt, with respect to the weight of the solution in a naphtenic oil containing 40% of aromatic products.

Preparation of salt M:

The same process is carried out as for the preparation of the salt which has been above-described, but by alkylating with two moles of n-hexylic alcohol per mole of equivalent of naphtalenic ring, the alkylation being carried out at a temperature of 80° C. for 5 hours. Then sulfonation is carried out. Then the acid just obtained is neutralized with monoethanolamine at a temperature of 80° C. and the salt obtained is put into a solution in hot condition at 30% in the same oil as the one used for the solution of salt L.

Preparation of salt T:

The same process is carried out as for the preparation of salt L, which has been above described, but by alkylating with 2 moles of ethyl-2-hexanol per mole of equivalent of naphtalenic ring, the alkylation being carried out at 80° for five hours. Then sulfonation is carried out. The acid thus obtained is neutralized at a temperature of 80° C. by means of monoethanolamine. The salt T thus obtained is put into a solution of 30% of salt in hot conditions in the same oil as the one used for the solution of salt L.

Preparation of salt R:

The same process is carried out as for the preparation of salt L, but by alkylating with 5 moles of isopropanol per mole of equivalent of naphtalenic ring, followed by sulfonation. The acid which has thus been obtained is neutralized under hot conditions by means of monoethanolamine, until the pH of 8 to 10 is obtained.

The salt R which has thus been obtained is put into a solution of 30% in the same oil as above described.

Preparation of salt Z:

The same process is carried out as for the preparation of salt R. The only difference is that alkylation takes place with 5 moles of isobutanol.

From these salts L, M, T, R, Z, treatments are carried out in a concrete-mixer by spraying 1 liter of this solution containing 30% of salt per ton of granulated fertilizer which is to be treated, and whose titre in nitrogen is 26%. A coating is carried out with 6 kg of talk per fertilizer ton.

With the treated fertilizers, cylindrical specimens are prepared which are subjected to pressure in clumping boxes. Four cycles of two days are carried out: a hot and humid day (29° C. and relative humidity of 60%) and a cold and dry day (26° C. and relative humidity of 40%).

The results obtained with the control untreated fertilizer used as control are compared:

The values which are obtained are an average of 10 values, the extreme values having been eliminated.

|  |  | applied crushing strength | relative clumping |
|---|---|---|---|
| untreated fertilizer control |  | 30 daN | 100% |
| fertilizer which has been treated with salt | L | 14 | 46% |
| fertilizer which has been treated with salt | M | 12 | 40% |
| fertilizer which has been treated with salt | T | 11 | 37% |
| fertilizer which has been treated with salt | R | 4,5 | 15% |
| fertilizer which has been treated with salt | Z | 3 | 10% |

It results clearly from examining these Examples that the products according to the invention have remarkable anticlumping properties and enable the setting up of salt on fertilizers to be effectively combated and this practically without any dust formation.

The invention also relates, as industrial products, to the salts and fertilizers which have been subjected to the treatment according to the invention and which consequently include a coating into the constitution of which at least one of the anticlumping products according to the invention is part of.

As a result of which, and whatever the embodiment adopted, there are thus provided anticlumping products and a treatment whose characteristics and advantages emerge sufficiently from the foregoing for it to be unnecessary to dwell further on this subject and which have, with respect to those pre-existing, numerous advantages among which may be mentioned that of practically eliminating undesirable dust which previously was inevitable.

As is self evident and as emerges already from the foregoing, the invention is in no way limited to those of its types of application and embodiments which have been more especially contemplated; it encompasses, on the contrary, all modifications.

We claim:

1. Anti-clumping products for salts, simple or complex fertilizers, said products comprising, as active substance an effective amount of at least one organic solvent-soluble salt of an alkanolamine, an alkylamine, a cycloalkylamine or an aromatic amine, having from 2 to 22 carbon atoms, with an alkyl naphtylene sulfonic acid whose alkylaryl radical includes from 11 to 32 carbon atoms.

2. Anti-clumping product according to claim 1, wherein said organic solvent-soluble salt is an alkanolamine salt.

3. Anti-clumping products according to claim 2, wherein said alkanolamine has from 2 to 12 carbon atoms.

4. Anti-clumping products according to claim 1, wherein the alkylamine, the cycloalkylamine, or the aromatic amine is selected from the group consisting of the following amines: triethylamine, dipropylamine, diisopropylamine, tripropylamine, dibutylamine, diisobutylamine, cyclohexylamine, aniline, quinoline, pyrrole or, or a mixture of at least two of these compounds.

5. Anti-clumping products according to claim 2, wherein said alkanolamine is selected from the group consisting of: monoethanolamine, diethanolamine, triethanolamine, monoisopropanolamine, diisopropanolamine, triisopropanolamine, or a mixture of at least two of these compounds.

6. Anti-clumping products according to claim 5, wherein the alkanolamine is selected from the group consisting of: β-propanolamine, β-dipropanolamine, β-tripropanolamine, monoisobutanolamine, diisobutanolamine, triisobutanolamine or a mixture of at least two of these compounds.

7. Anti-clumping products according to claim 1, wherein the alkylnaphtylene-sulfonic acid comprises from 11 to 23 carbon atoms.

8. Anti-clumping products according to claim 1, wherein the alkylnaphtylene-sulfonic acid comprises from 24 to 32 carbon atoms.

9. Anti-clumping products according to claim 7, wherein the alkylnaphtylene-sulfonic acid comprises from 11 to 17 carbon atoms.

10. Anti-clumping products according to claim 7, wherein the alkylnaphtylene-sulfonic acid comprises from 18 to 23 carbon atoms.

11. Anti-clumping products according to claim 7, wherein the alkylaryl-sulfonic acid is selected from the group consisting of the following acids: tripropyl and triisopropylnaphtylene-sulfonic, tripropyl and triisopropylmethylnaphtylene-sulfonic, tripropyl and triisopropyldimethyl naphtylene-sulfonic, dibutyl and diisobutylmethyl naphtylene-sulfonic, dibutyl and diisobutyldimethylnaphtylene-sulfoni-diamylnaphtylene-sulfonic, diamylmethylnaphtylene-sulfonic diamyldimethlnaphtylene-sulfonic, dihexylnaphtylene-sulfoni-dihexylmethylnaphtylene-sulfonic.

12. Anti-clumping products according to claim 8, wherein the alkylaryl-sulfonic acid is selected from the group consisting of the following acids: dihexyldimethylnaphtylene-sulfonic, triamylnaphtylene-sulfonic, triamylmethylnaphtylene-sulfonic, triamyldimethyl-naphtalene-sulfonic, ethyl-2-hexylnaphtylene-sulfonic, ethyl-2-hexylmethylnaphtylene-sulfonic ethyl-2-hexyl-dimethylnaphtylene-sulfonic, tetraamylnaphtylene-sulfonic, tetraamylmethylnaphtylene-sulfonic, tetraamyldimethylnaphtalene-sulfonic, dinonylnaphtylene-sulfonic dinonylmethylnaphtylene-sulfonic, dinonyl dimethyl-naphtylene-sulfonic.

13. Anti-clumping products according to claim 7 wherein the alkylaryl-sulfonic acid is selected from the group consisting of the following acids: tributyl and triisobutylnaphtylene-sulfonic, tributyl and triisobutylmethylnaphtylene-sulfonic, tetrapropyl and tetraisopropylnaphtylene-sulfonic, tetrapropyl and tetraisopropylmethylnaphtylene-sulfonic.

14. Anti-clumping products according to claim 8, wherein the alkylaryl-sulfonic acid is selected from the group consisting of the following acids: tributyl and triisobutyldimethylnaphtylene-sulfonic, tetrapropyl and tetraisopropyldimethylnaphtylene-sulfonic, pentapropyl and pentaisopropylnaphtylene-sulfonic, pentapropyl and pentaisopropylmethylnaphtylene-sulfonic, pentapropyl and pentaisopropyldimethylnaphtylene-sulfonic, tetrabutyl and tetraisobutylnaphtylene-sulfonic, tetrabutyl and tetraisobutylmethylnaphtylene-sulfonic, tetrabutyl and tetraisobutyldimethylnaphtylene-sulfonic, pentabutyl and pentaisobutylnaphtylene-sulfonic, pentabutyl and pentaisobutylmethylnaphtylene-sulfonic, pentabutyl and pentaisobutyldimethylnaphtylene-sulfonic.

15. Anti-clumping products according to claim 1 wherein the alkylnaphtylene-sulfonic acid is according to claim 13 or 14 and the amine is monoethanolamine.

16. Anti-clumping products according to claim 1, wherein alkylnaphtylene-sulfonic acid is according to claim 13 or 14 and the amine is monoisopropanolamine.

17. Anti-clumping products according to claim 7 wherein the alkylnaphtylene-sulfonic acid is tetrapropyl and tetraisopropylnaphtylene-sulfonic acid.

18. Anti-clumping products according to claim 7 wherein the alkylnaphtylene-sulfonic acid is tetrapropyl and tetraisopropylmethylnaphtylene-sulfonic acid.

19. Anti-clumping products according to claim 8, wherein the alkylnaphtylene-sulfonic acid is tetrapropyl and tetraisopropyldimethylnaphtylene-sulfonic acid.

20. Anti-clumping products according to claim 8, wherein the alkylnaphtylene-sulfonic acid is tetrabutyl and tetraisobutyl naphtylene sulfonic.

21. Anti-clumping products according to claim 8, wherein the alkylnaphtylene-sulfonic acid is tetrabutyl and tetraisobutylmethylnaphtylene sulfonic.

22. Anti-clumping products according to claim 8, wherein the alkylnaphtylene-sulfonic acid is tetrabutyl and tetraisobutyldimethylnaphtylene-sulfonic.

23. Anti-clumping products according to claim 7, comprising a mixture of at least two of the amine salts of the alkylaryl-sulfonic acids.

24. Anti-clumping products according to claim 8, comprising a mixture of at least two of the amine salts of the alkylaryl-sulfonic acids.

25. Anti-clumping products for salts, simple fertilizers and complex fertilizers, containing in combination at least one anti-clumping product according to claim 1 and another compound, notably an anti-clumping product which is a fatty acid.

26. Anti-clumping products according to claim 25, wherein said other compound entering into the combination with said anti-clumping product is selected from the group comprising fatty amines.

27. Anti-clumping products according to claim 25, wherein the compound entering into the combination with the anti-clumping product is a fatty acid having from 4 to 22 carbon atoms.

28. Anti-clumping products according to claim 27, wherein said fatty acid is selected from among the following acids: butyric, hexamoic, ethylexanoic, capric, undecyclic, lauric, palmitic, stearic, oleic, linoleic, linolenic, ricinoleic, benzoic, benzenepolycarboxylic, naphtoic, naphtylenepolycarboxylic.

29. Anti-clumping products according to claim 28, wherein the fatty acid is stearic acid.

30. Anti-clumping products according to claim 27, wherein the fatty acid in combination with one of the anti-clumping products is present in the mixture in the proportion of about 30% to about 70% of the total weight of the mixture.

* * * * *